(12) United States Patent
Zhang

(10) Patent No.: US 12,551,476 B2
(45) Date of Patent: Feb. 17, 2026

(54) EYE-SOOTHING EXTERNALLY-APPLIED LIQUID MEDICINE AND PREPARATION METHOD THEREFOR

(71) Applicant: Boke Zhang, Canton, MA (US)

(72) Inventor: Boke Zhang, Canton, MA (US)

(73) Assignee: Boke Zhang, Canton, MA (US)

( * ) Notice: Subject to any disclaimer, the term of this patent is extended or adjusted under 35 U.S.C. 154(b) by 565 days.

(21) Appl. No.: 17/982,536

(22) Filed: Nov. 8, 2022

(65) Prior Publication Data

US 2023/0321071 A1    Oct. 12, 2023

(30) Foreign Application Priority Data

Apr. 6, 2022   (CN) .......................... 202210357770.6

(51) Int. Cl.

| | | |
|---|---|---|
| *A61K 47/44* | (2017.01) | |
| *A61K 9/00* | (2006.01) | |
| *A61K 31/05* | (2006.01) | |
| *A61K 31/07* | (2006.01) | |
| *A61K 31/4409* | (2006.01) | |
| *A61K 31/46* | (2006.01) | |
| *A61K 31/525* | (2006.01) | |
| *A61K 31/7076* | (2006.01) | |
| *A61K 31/714* | (2006.01) | |
| *A61K 36/21* | (2006.01) | |
| *A61K 36/28* | (2006.01) | |
| *A61K 36/344* | (2006.01) | |
| *A61K 36/43* | (2006.01) | |
| *A61K 36/45* | (2006.01) | |
| *A61K 36/48* | (2006.01) | |
| *A61K 36/482* | (2006.01) | |
| *A61K 36/605* | (2006.01) | |
| *A61K 36/80* | (2006.01) | |
| *A61K 45/06* | (2006.01) | |
| *A61K 47/10* | (2017.01) | |
| *A61K 47/12* | (2006.01) | |

(52) U.S. Cl.
CPC ............ *A61K 31/46* (2013.01); *A61K 9/0048* (2013.01); *A61K 9/008* (2013.01); *A61K 31/05* (2013.01); *A61K 31/07* (2013.01); *A61K 31/4409* (2013.01); *A61K 31/525* (2013.01); *A61K 31/7076* (2013.01); *A61K 31/714* (2013.01); *A61K 36/21* (2013.01); *A61K 36/28* (2013.01); *A61K 36/344* (2013.01); *A61K 36/43* (2013.01); *A61K 36/45* (2013.01); *A61K 36/48* (2013.01); *A61K 36/482* (2013.01); *A61K 36/605* (2013.01); *A61K 36/80* (2013.01); *A61K 45/06* (2013.01); *A61K 47/10* (2013.01); *A61K 47/12* (2013.01); *A61K 47/44* (2013.01)

(58) Field of Classification Search
CPC ...... A61K 31/46; A61K 9/0048; A61K 9/008; A61K 31/05; A61K 31/07; A61K 31/4409; A61K 31/525; A61K 31/7076; A61K 31/714; A61K 36/185; A61K 36/21; A61K 36/28; A61K 36/344; A61K 36/43; A61K 36/45; A61K 36/48; A61K 36/482; A61K 36/605; A61K 36/80; A61K 45/06; A61K 47/10; A61K 47/12; A61K 47/44; A61K 2236/39; A61K 9/08; A61K 36/355; A61K 36/537; A61K 36/539; A61K 36/8988; A61K 31/047; A61K 31/51; A61K 47/36; A61P 27/02; A61P 9/14; Y02A 50/30

See application file for complete search history.

(56) References Cited

U.S. PATENT DOCUMENTS

2014/0227217 A1*  8/2014  Matsuzawa  ............... A61K 8/60
                                                           510/491

FOREIGN PATENT DOCUMENTS

| CN | 109091675 A | * | 12/2018 | ............ A61K 31/216 |
| CN | 113855557 A | * | 12/2021 | ............ A61K 31/047 |

OTHER PUBLICATIONS

CN109091675b, Google Patents Translation, 14 pages. <https://patents.google.com/patent/CN109091675B/en?oq=109091675>. (Year: 2018).*

CN113855557a, Google Patents Translation, 8 pages. <https://patents.google.com/patent/CN113855557A/en?oq=CN113855557A>. (Year: 2021).*

Tang, Y., et al., Review on research of the phytochemistry and pharmacological activities of Celosia argentea, 2016, Brazil J Pharma, 26:787-796, 10 pages. <dx.doi.org/10.1016/j.bjp.2016.06.001>. (Year: 2016).*

(Continued)

*Primary Examiner* — Aaron J Kosar
*Assistant Examiner* — Jennifer Lynn Cain
(74) *Attorney, Agent, or Firm* — ANOVA LAW GROUP, PLLC

(57) ABSTRACT

An eye-soothing externally-applied liquid medicine includes a phase A, a phase B, an adjuvant and purified water. The phase A includes a western medicine component and a traditional Chinese medicine component by mass. The western medicine component includes at least one of 0.1 g of atropine, 0.1 g of homatropine, and 0.1 g of tropicamide. The traditional Chinese medicine component includes at least one of 0.5 g of a cassia seed extract, 0.5 g of a mulberry leaf extract, 0.2 g of a marigold flower extract, 0.5 g of a fibs albiziae extract, 0.5 g of an eyebright extract, and 0.2 g of a common foxglove leaf extract. The phase B includes 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.001 g of lutein.

12 Claims, 14 Drawing Sheets

(56) References Cited

OTHER PUBLICATIONS

Dubashynskaya, N., et al., Polysaccharides in ocular drug delivery, 2020, Pharmaceutics, 12:22, 30 pages. <http://dx.doi.org/10.3390/pharmaceutics 12010022>. (Year: 2019).*

Yang, S., et al., The Difference of Chemical Components and Biological Activities of the Crude Products and the Salt-Processed Product from Semen Cuscutae, 2016, Evid Compl Alt Med, 8656740, 9 pages. <http://dx.doi.org/10.1155/2016/8656740>. (Year: 2016).*

Su, S., et al., Retrospective evaluation of the curative effect of traditional Chinese medicine on dry eye disease, 2021, Tzu Chi Med J, 33(4):365-369, 5 pages. <https://doi.org/10.4103/tcmj.tcmj_281_20>. (Year: 2021).*

Nutri Avenue, Lutein and Zeaxanthin From Marigold Extract Are the Key Solution for Optimal Eye Health, 2021, 13 pages. <https://www.nutriavenue.com/lutein-and-zeaxanthin-from-marigold-extract-are-the-key-solution-for-optimal-eye-health/>. (Year: 2021).*

McCulloch, M., Do Eyebright Drops and Supplements Benefit Health?, 2019, HealthLine, 14 pages. <https://web.archive.org/web/20190412014107/https://www.healthline.com/nutrition/eyebright>. (Year: 2019).*

School of Chinese Medicine, Heheanhua, 2021, 1 page. <https://web.archive.org/web/20210630090520/https://sys01.lib.hkbu.edu.hk/cmed/mmid/detail.php?pid=B00301&lang=eng&page=1&sort=name_cht>. (Year: 2021).*

World Vision Report, 2020, pp. 1-160, World Health Organization.

* cited by examiner

| Placement condition | Time point (day) | Low concentration ||
|---|---|---|---|
| | | Viscosity (mpa·s) | Representation of appearance characters |
| Room temperature (25°C) | 0 | 15.1 | √ |
| | 30 | 14.6 | √ |
| | 90 | 14.2 | √ |
| | 180 | 13.7 | √ |
| High temperature (40°C) | 0 | 15.1 | √ |
| | 30 | 14.2 | √ |
| Refrigeration (5°C) | 0 | 15.1 | √ |
| | 30 | 14.8 | √ |
| | 90 | 14.5 | √ |
| | 180 | 14.0 | √ |
| Remarks: The representation of appearance characters in the table includes whether layering occurs and whether color changes. If the layering does not occur and the color does not change, represent with a symbol '√', and otherwise, represent with a symbol '×'. ||||

FIG. 7

| Placement condition | Time point (day) | High concentration ||
|---|---|---|---|
| | | Viscosity (mpa·s) | Representation of appearance characters |
| Room temperature (25°C) | 0 | 15.5 | √ |
| | 30 | 15.1 | √ |
| | 90 | 14.4 | √ |
| | 180 | 14.0 | √ |
| High temperature (40°C) | 0 | 15.5 | √ |
| | 30 | 14.2 | √ |
| Refrigeration (5°C) | 0 | 15.5 | √ |
| | 30 | 15.1 | √ |
| | 90 | 14.8 | √ |
| | 180 | 14.3 | √ |

Remarks: The representation of appearance characters in the table includes whether layering occurs and whether color changes. If the layering does not occur and the color does not change, represent with a symbol '√', and otherwise, represent with a symbol '×'.

FIG. 8

| Placement condition | Time point (day) | Low concentration | |
|---|---|---|---|
| | | Viscosity (mpa·s) | Representation of appearance characters |
| Room temperature (25°C) | 0 | 15.3 | √ |
| | 30 | 15.0 | √ |
| | 90 | 14.6 | √ |
| | 180 | 14.1 | √ |
| High temperature (40°C) | 0 | 15.3 | √ |
| | 30 | 14.4 | √ |
| Refrigeration (5°C) | 0 | 15.3 | √ |
| | 1 | 14.9 | √ |
| | 2 | 14.5 | √ |
| | 3 | 14.4 | √ |

Remarks: The representation of appearance characters in the table includes whether layering occurs and whether color changes. If the layering does not occur and the color does not change, represent with a symbol '√', and otherwise, represent with a symbol '×'.

FIG. 9

| Placement condition | Time point (day) | High concentration | |
|---|---|---|---|
| | | Viscosity (mpa·s) | Representation of appearance characters |
| Room temperature (25°C) | 0 | 15.6 | √ |
| | 30 | 15.2 | √ |
| | 90 | 14.7 | √ |
| | 180 | 14.2 | √ |
| High temperature (40°C) | 0 | 15.6 | √ |
| | 30 | 14.5 | √ |
| Refrigeration (5°C) | 0 | 15.6 | √ |
| | 30 | 15.3 | √ |
| | 90 | 15.0 | √ |
| | 180 | 14.7 | √ |

Remarks: The representation of appearance characters in the table includes whether layering occurs and whether color changes. If the layering does not occur and the color does not change, represent with a symbol '√', and otherwise, represent with a symbol '×'.

FIG. 10

| Placement condition | Time point (day) | Low concentration ||
|---|---|---|---|
| | | Viscosity (mpa·s) | Representation of appearance characters |
| Room temperature (25°C) | 0 | 15.0 | √ |
| | 30 | 14.7 | √ |
| | 90 | 14.1 | √ |
| | 180 | 13.6 | √ |
| High temperature (40°C) | 0 | 15.0 | √ |
| | 30 | 14.1 | √ |
| Refrigeration (5°C) | 0 | 15.0 | √ |
| | 30 | 14.8 | √ |
| | 90 | 14.3 | √ |
| | 180 | 14.0 | √ |
| Remarks: The representation of appearance characters in the table includes whether layering occurs and whether color changes. If the layering does not occur and the color does not change, represent with a symbol '√', and otherwise, represent with a symbol '×'. ||||

FIG. 11

| Placement condition | Time point (day) | High concentration | |
|---|---|---|---|
| | | Viscosity (mpa·s) | Representation of appearance characters |
| Room temperature (25°C) | 0 | 15.8 | √ |
| | 30 | 15.3 | √ |
| | 90 | 14.6 | √ |
| | 180 | 14.0 | √ |
| High temperature (40°C) | 0 | 15.8 | √ |
| | 30 | 14.5 | √ |
| Refrigeration (5°C) | 0 | 15.8 | √ |
| | 30 | 15.3 | √ |
| | 90 | 14.8 | √ |
| | 180 | 14.5 | √ |

Remarks: The representation of appearance characters in the table includes whether layering occurs and whether color changes. If the layering does not occur and the color does not change, represent with a symbol '√', and otherwise, represent with a symbol '×'.

FIG. 12

| Placement condition | Time point (day) | Viscosity (mpa·s) | Representation of appearance characters |
|---|---|---|---|
| Room temperature (25°C) | 0 | 19.8 | √ |
| | 30 | 19.4 | √ |
| | 90 | 18.2 | √ |
| | 180 | 17.5 | √ |
| High temperature (40°C) | 0 | 19.8 | √ |
| | 30 | 18.3 | √ |
| Refrigeration (5°C) | 0 | 19.8 | √ |
| | 30 | 19.5 | √ |
| | 90 | 19.0 | √ |
| | 180 | 18.6 | √ |
| Remarks: The representation of appearance characters in the table includes whether layering occurs and whether color changes. If the layering does not occur and the color does not change, represent with a symbol '√', and otherwise, represent with a symbol '×'. | | | |

FIG. 13

| Placement condition | Time point (day) | Viscosity (mpa·s) | Representation of appearance characters |
|---|---|---|---|
| Room temperature (25°C) | 0 | 19.6 | √ |
| | 30 | 18.8 | √ |
| | 90 | 18.2 | √ |
| | 180 | 17.6 | √ |
| High temperature (40°C) | 0 | 19.6 | √ |
| | 30 | 18.0 | √ |
| Refrigeration (5°C) | 0 | 19.6 | √ |
| | 30 | 19.3 | √ |
| | 90 | 18.7 | √ |
| | 180 | 17.9 | √ |

Remarks: The representation of appearance characters in the table includes whether layering occurs and whether color changes. If the layering does not occur and the color does not change, represent with a symbol '√', and otherwise, represent with a symbol '×'.

FIG. 14

| Placement condition | Time point (day) | Viscosity (mpa·s) | Representation of appearance characters |
|---|---|---|---|
| Room temperature (25°C) | 0 | 20.2 | √ |
| | 30 | 19.7 | √ |
| | 90 | 19.0 | √ |
| | 180 | 18.6 | √ |
| High temperature (40°C) | 0 | 20.2 | √ |
| | 30 | 18.9 | √ |
| Refrigeration (5°C) | 0 | 20.2 | √ |
| | 30 | 19.8 | √ |
| | 90 | 19.5 | √ |
| | 180 | 18.8 | √ |

Remarks: The representation of appearance characters in the table includes whether layering occurs and whether color changes. If the layering does not occur and the color does not change, represent with a symbol '√', and otherwise, represent with a symbol '×'.

FIG. 15

EYE-SOOTHING EXTERNALLY-APPLIED LIQUID MEDICINE AND PREPARATION METHOD THEREFOR

CROSS REFERENCE TO THE RELATED APPLICATIONS

This application is based upon and claims priority to Chinese Patent Application No. 202210357770.6, filed on Apr. 6, 2022, the entire contents of which are incorporated herein by reference.

TECHNICAL HELD

The present disclosure relates to the technical field of eye care, in particular to an eye-soothing externally-applied liquid medicine and a preparation method therefor.

BACKGROUND

The World Health Organization recently called for great attention to the problem of myopia in children and adolescents. Early prevention, early care and early treatment are achieved through routine examination, which can effectively avoid eye diseases. At present, some countries are taking comprehensive measures to strengthen the prevention and control of juvenile myopia. According to the *World Vision Report* released by the World Health Organization, there are currently about 2.6 billion people with myopia in the world, of which 312 million people are under the age of 19, The prevalence of myopia in children and adolescents has been increasing in recent years and will continue to increase substantially in the coming decades. The report analyzes that in modern society, people stay indoors for a long time to engage in a lot of 'close work', which has led to an increase in the number of people with myopia around the world. The Director-General Tedros Adhanom Ghebreyesus of the World Health Organization said that integrating eye care into national health plans and essential health care services is an important part of achieving universal health coverage in every country.

With the popularization of electronic products, while bringing convenience to people's lives, it is also more likely to cause eye fatigue, especially for some office workers who need to work in front of computers for a long time. Eye fatigue symptoms such as eye dryness, drowsiness, aching pain and swelling are very common. In this regard, people usually choose eye drops to relieve the symptoms of eye fatigue so as to prevent and reduce the problem of high incidence rate of myopia in adolescents. Moreover, when the eyes are fatigued for a long time, it is easy to cause eye inflammations such as xerophthalmia, conjunctivitis, trachoma, and stye, which can cause or even aggravate eye disease problems such as astigmatism, windward tears, glaucoma, muscae volitantes, blood blindness, and maculopathy.

However, traditional products on the market need to be dropped into eyes when in use, which is easy to cause irritation to the eyes and further cause human discomfort. In addition, due to a special internal structure of the eyes, it is more difficult for the eyes to resist foreign bacteria than the skin. If eye drops are not used properly, it is easy to cause eye inflammations. Therefore, in view of the actual needs and the shortcomings of the products on the market, there is an urgent need for an eye-soothing externally-applied product that can be applied externally to effectively alleviate the eye fatigue symptoms such as eye dryness, drowsiness, aching pain and swelling without entering the eyeballs, which is an urgent problem to be solved.

SUMMARY

The present disclosure aims to provide an eye-soothing externally-applied liquid medicine and a preparation method therefor. The eye-soothing externally-applied liquid medicine has the advantages of being external application, safety, no irritation and good efficacy.

In order to achieve the above-mentioned purpose, the present disclosure provides the following technical solutions:

an eye-soothing externally-applied liquid medicine includes a phase A capable of regulating ocular microcirculation and intraocular pressure and relieving asthenopia, a phase B capable of replenishing nutrients to eyes, an adjuvant and purified water.

The phase A includes a western medicine component I and a traditional Chinese medicine component II by mass;
the western medicine component I includes at least one of atropine, homatropine and tropicamide, and the mass of each of which is 0.01 g-10 g, preferably 0.5 g-6 g, and more preferably 0.1 g-3 g;
the traditional Chinese medicine component II includes at least one of a cassia seed extract, a mulberry leaf extract, a marigold flower extract, a *Flos albiziae* extract, an eyebright extract, and a common foxglove leaf extract, and the mass of each of which is 0.1 g-6 g, preferably 0.1 g-3 g, and more preferably 0.1 g-1 g.
the phase B includes the following components by mass: vitamin B2, vitamin B12, lutein, vitamin A, vitamin B1, adenosine triphosphate and *Vaccinium myrtillus* seed oil, and the mass of each of which is 0.001 g-6 g, preferably 0.1 g-3 g, and more preferably 0.1 g-2 g;
the adjuvant includes 0.1 g-10 g of hydrogenated castor oil, 1 g-10 g of cetyl ethyl hexanoate, and 0.1 g-2 g of phenoxyethanol by mass, wherein the mass of the hydrogenated castor oil is preferably 0.2 g-8 g and more preferably 1 g-6 g, the mass of the cetyl ethyl hexanoate is preferably 2 g-5 g, and the mass of the phenoxyethanol is preferably 0.2 g-1 g and more preferably 0.2 g-0.8 g; and
the mass of the purified water is 1 g-300 g. Preferably, the adjuvant further includes one of sodium hyaluronate, exopolysaccharide, sclerotium gum, or a mixture thereof.

Preferably, the phase A further includes one of a *Fructus lycii* extract, a honeysuckle flower extract, a *Flos chrysanthemi* extract, a *Rhizoma gastrodiae* extract, a *Radix et Rhizoma salviae* miltiorrhizae extract, a *Radix scuteiiariae* extract and a *Radix codonopsis* extract, or a mixture thereof.

Preferably, the phase A further includes one of a *Semen cuscutae* extract; a glossy privet fruit extract, a *Radix angelicas*: sinensis extract, a prunella vulgaris extract and a swordlike *Atractylodes rhizome* extract, or a mixture thereof.

Preferably, the phase A further includes one of a *Flos buddlejae* extract, a *Flos eriocauli* extract, a *Celosiae semen* extract, a *radix et Rhizoma ginseng* extract and a *Caulis dendrobii* extract, or a mixture thereof.

Preferably, the eye-soothing externally-applied liquid medicine includes the following components: the phase A capable of regulating ocular microcirculation and intraocular pressure and relieving asthenopia, the phase B capable of replenishing nutrients to eyes, the adjuvant and the purified water, where the phase A includes the western medicine component I and the traditional Chinese medicine component II by mass, where the western medicine component I includes 0.1 g of the atropine;

the traditional Chinese medicine component II includes 0.5 g of the cassia seed extract, 0.5 g of the mulberry leaf extract, 0.2 g of the marigold flower extract, 0.5 g of the *Flos albiziae* extract, 0.5 g of the eyebright extract, 0.2 g of the *Radix codonopsis* extract, 0.2 g of the common foxglove leaf extract, 0.5 g of the *Semen cuscutae* extract, 0.5 g of the *Celosiae semen* extract, and 0.5 g of the *Flos buddlejae* extract;

the phase B includes the following components by mass: 1 g of the vitamin A, 0.5 g of the vitamin B1, 0.005 g of the vitamin B2, 0.001 g of the vitamin B12, 0.5 g of the adenosine triphosphate, 1 g of the *Vaccinium myrtillus* seed oil, and 0.001 g of the lutein;

the adjuvant includes the following components by mass: 0.1 g of the sodium hyaluronate, 0.1 g of the exopolysaccharide, 6 g of the hydrogenated castor oil, 1 g of the cetyl ethyl hexanoate, and 0.6 g of phenoxyethanol, and the mass of the purified water is 84.993 g.

The present disclosure also provides a method for preparing an eye-soothing externally-applied liquid medicine, comprising the following steps:

S01. accurately weighing a water phase: 84.993 g of purified water, 0.1 g of atropine, 0.5 g of a cassia seed extract, 0.5 g of a mulberry leaf extract, 0.2 g of a marigold flower extract, 0.5 g of a fins albiziae extract, 0.5 g of an eyebright extract, 0.2 g of a *Radix codonopsis* extract, 0.2 g of a common foxglove leaf extract, 0.5 g of a *Semen cuscutae* extract, 0.5 g of a *Celosiae semen* extract, 0.5 g of a *Flos buddlejae* extract, 0.5 g of vitamin B1, 0.005 g of vitamin B2, 0.001 g of vitamin B12, 0.5 g of adenosine triphosphate, 0.1 g of sodium hyaluronate, and 0.1 g of exopolysaccharide;

S02. accurately weighing an oil phase: 6 g of hydrogenated castor oil, 1 g of cetyl ethyl hexanoate, 1 g of *Vaccinium myrtillus* seed oil, 1 g of vitamin A, and 0.001 g of lutein;

S03. accurately weighing an additive phase: 0.6 g of phenoxyethanol;

S04. mixing all the components in the water phase and then stirring until the obtained mixture is dissolved, and heating up to 50-95° C., preferably 60-90° C., and more preferably 70-80° C.;

S05. mixing all the components in the oil phase and then evenly stirring the obtained mixture, and heating up to 50-95° C., preferably 60-90° C., and more preferably 70-80° C., a speed range of stirring being 200-2500 rpm, preferably 300-1500 rpm, and more preferably 300-1000 rpm;

S06. under the condition of stirring or homogenizing, slowly adding the oil phase into the water phase, and stirring for 5-30 min, a speed range of stirring being 200-2500 rpm, preferably 300-2000 rpm, and more preferably 300-1500 rpm, and during stirring, the temperature being 50-95° C., preferably 60-90° C., and more preferably 70-80° C.; and S07. stirring at a reduced speed and then cooling down to 30-50° C., finally adding the additive phase, and stirring until room temperature to obtain the eye-soothing externally-applied liquid medicine, the speed range of stirring being 200-600 rpm.

Preferably, the temperature is 72-80° C. in step S04.

Preferably in step S05, the temperature is 72-80° C., and the speed range is 300-950 rpm.

Preferably, in step S06, the stirring lasts for 5-15 min, the speed range of stirring is 500-1500 rpm, and the temperature is 72-80° C. during stirring.

Preferably, in step S07, the speed range of stirring is 250-500 rpm, and the temperature is 35-45° C. during stirring.

Compared with the prior art, the technology provided by the present disclosure has the following effects and advantages:

The efficacies of some components in the phase A are given as follows:

Atropine: regulating intraocular pressure and accelerating metabolism.

Marigold flower extract: promoting the regeneration of rhodopsin in retinal cells, being capable of preventing severe myopia and detached retina, being capable of improving vision and protecting vision, being also capable of effectively relieving blurred vision, eye dryness, eye swelling, eye pain, photophobia, etc., and protecting vision health by improving the antioxidant capacity of lens.

Common foxglove leaf extract: digitalin can activate the activity of pigment epithelial enzymes in retinal pigment epithelial cells, enhance ocular lipid metabolism, restore photoreceptor cells, treat blurred vision and double vision, enhance ciliary muscle contraction and regulation ability by increasing blood flow in the ciliary body, and relieve the problems such as blurred vision caused by myogenic eye fatigue.

Eyebright extract: effectively scavenging oxygen free radicals in the body; and the antioxidant effect can eliminate eye fatigue, improve vision and eye functions, and restore bright eyes.

The efficacies of some components in the phase B are given as follows:

Vitamin A: the first recognized function of the vitamin A is to participate in maintaining the cycle of scotopic photoreceptors in visual cells. The rhodopsin contained in rhabdocytes on the retina is sensitive to dim light. Upon sensing light with the rhodopsin, 11-cis-retinaldehyde is converted to all-trans retinaldehyde and separated from opsin, thus producing a visual electrical signal. In order to maintain good dim light vision, it is necessary to continuously supply sufficient 11-cis-retinaldehyde to the rhabdocytes. When the vitamin A is deficient, the supply of the 11-cis-retinaldehyde decreases, and the dark adaptation time is prolonged.

Vitamin B2: the deficiency of vitamin B2 can cause the eye problems such as blepharitis, photophobia, easy tearing, easy tiredness, blurred vision, conjunctival congestion, corneal capillary hyperplasia, and conjunctivitis.

Vitamin B12: the deficiency of vitamin B12 can cause yellowing of the eyes.

Adenosine triphosphate: it is a high-energy phosphate compound. In cells, it can interconvert with adenosine diphosphate to store and release energy, thereby ensuring the energy and nutrition supply for various life activities of the cells.

*Vaccinium myrtillus* seed oil: promoting regeneration of the rhodopsin in retinal cells, thus preventing myopia and improving eyesight.

Lutein: it can help the retina of the eyes resist ultraviolet rays. Lutein is an important antioxidant for the eyes. Supplementing a large amount of lutein to the human body will contribute to maintaining visual endurance, improve visual response time, and reduce visual damage. For people with myopia; supplementation with lutein can delay the increase in the degree of myopia.

The synergistic effect between the components of the phase A and the phase B can instantly relieve visual fatigue, regulate intraocular pressure, replenish nutrients to the eyes, make the closed eye environment moister, repair intraocular microcirculation, complement each other and work synergistically.

The present disclosure also has the advantages that:
1. The liquid medicine is only applied onto the upper and lower eyelids by massaging and rolling without entering the eyes, thus not reaching the retina and being free from irritation or damage to the eyes.
2. The permeability is high, the absorption speed is fast, and the absorption rate is close to 100%.
3. After being applied, the liquid medicine can immediately relieve the symptoms such as eye dryness, sleepiness, weakness, soreness and swelling of the eyes, with significant effect.
4. The liquid medicine has safety guarantee and does not contain hormones, anesthetics and other harmful ingredients.

BRIEF DESCRIPTION OF THE DRAWINGS

FIG. 5 shows the effect of a liquid medicine used for 4 weeks in an embodiment 5;
FIG. 6 shows the effect of a liquid medicine used for 4 weeks in an embodiment 6;
FIG. 7 is a statistical table of stability evaluation results of a low-concentration atropine sample;
FIG. 8 is a statistical table of stability evaluation results of a high-concentration atropine sample;
FIG. 9 is a statistical table of stability evaluation results of a low-concentration homatropine sample;
FIG. 10 is a statistical table of stability evaluation results of a high-concentration homatropine sample;
FIG. 11 is a statistical table of stability evaluation results of a low-concentration tropicamide sample;
FIG. 12 is a statistical table of stability evaluation results of a high-concentration tropicamide sample;
FIG. 13 is a statistical table of stability evaluation results of a sample of a traditional Chinese medicine composition I;
FIG. 14 is a statistical table of stability evaluation results of a sample of a traditional Chinese medicine composition II;
and
FIG. 15 is a statistical table of stability evaluation results of a sample of a traditional Chinese medicine composition III.

DETAILED DESCRIPTION OF THE EMBODIMENTS

Figure 1:
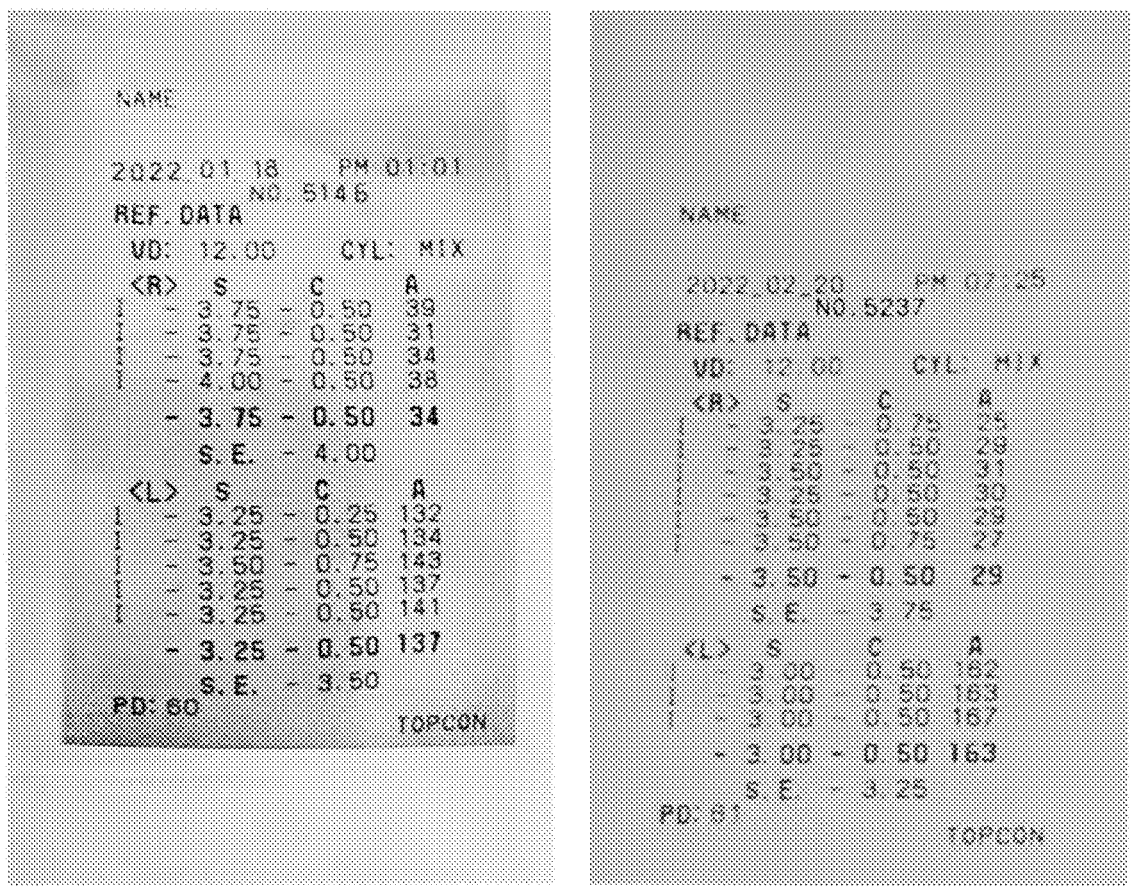
FIG. 1 shows the effect of a liquid medicine used for 4 weeks in an embodiment 1B.

Many experiments and validations have been conducted. Only some exemplary embodiments are illustrated below for a clear and complete description of the technical solutions of the present disclosure. Obviously, the described embodiments are only part of the embodiments of the present disclosure, not all of them, Based on the embodiments of the present disclosure, all other embodiments obtained by those ordinary skilled in the art without creative work shall fall within the protection scope of the present disclosure.

1. Use NDJ-79A digital rotational viscometer (Shanghai Changji Geological Instrument Co., Ltd.) to measure the viscosity (mpa·s).

Stability is tested under the following three common conditions:
1) Room temperature (25° C., T=0, 1 month, 3 months, 6 months);
2) High temperature (40° C., T=0, 1 month); and
3) Refrigerate (5° C., T=0, 1 month, 3 months, 6 months).

The data measured at each time point include indicators such as viscosity, and appearance characterization (whether layering occurs and whether color changes). See an attached table after each embodiment for specific results.

2. The prepared externally-applied liquid medicine has been tried out by some experiencers, and the effect thereof is significant.

3. How to use: tilting your head back slightly, closing your eyelids, using a carrier (such as a roller ball) of the eye-soothing externally-applied liquid medicine to touch your eyelid skin, and turning the carrier clockwise or counterclockwise in a circle for at least 10 times until you feel the liquid medicine stay on the eyelid surface. During use, it is necessary to keep using the liquid medicine multiple times a day, especially after using the eyes for a long time (such as driving, looking at mobile phones, watching computers, reading books), which will optimize the using effect; and the liquid medicine should be used at least 10 times a day.

Embodiment 1A: Low-Concentration Atropine (0.1%)

An eye-soothing externally-applied liquid medicine is prepared by mixing a phase A capable of regulating ocular microcirculation and intraocular pressure and relieving asthenopia, a phase B capable of replenishing nutrients to eyes, an adjuvant and purified water, where
the phase A includes 0.1 g of atropine by mass;
the phase B includes the following components by mass: 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.001 g of lutein;
the adjuvant includes the following components by mass: 0.1 g of sodium hyaluronate, 0.1 g of exopolysaccharide, 6 g of hydrogenated castor oil, 1 g of cetyl ethyl hexanoate, and 0.6 g of phenoxyethanol; and
the mass of the purified water is 89.093 g.

The above components are divided into an oil phase, a water phase and an additive phase as follows:
the water phase: 89.093 g of the purified water, 0.1 g of the atropine, 0.5 g of the vitamin B1, 0.005 g of the vitamin B2, 0.001 g of the vitamin B12, 0.5 g of the adenosine triphosphate, 0.1 g of the sodium hyaluronate, and 0.1 g of the exopolysaccharide;
the oil phase: 6 g of the hydrogenated castor oil, 1 g of the cetyl ethyl hexanoate, 1 g of the *Vaccinium myrtillus* seed oil, 1 g of the vitamin A, and 0.001 g of the lutein; and
the additive phase: 0.6 g of the phenoxyethanol.

Preparation method: adding the components in the water phase into the purified water, and heating up to 80° C.;

mixing the components in the oil phase and then stirring evenly, and heating up to 80° C.; slowly adding the oil phase into the water phase while stirring at a high speed (1500 rpm), and stirring continuously for 10 min at the high speed; after that, stirring at a reduced speed and then cooling down to 40° C.; and finally, adding the additive phase, and stirring until room temperature to obtain yellowish liquid.

The obtained stability results are shown in FIG. 7.

Embodiment 1B: High-Concentration Atropine (2%)

The specific components and method for preparing an externally-applied liquid medicine containing atropine (with a high concentration of 2%) are the same as those of the above-mentioned embodiment 1A, except that the concentration of the atropine is high, that is, the dosage of the atropine is 2% (i.e., 2 g in the water phase). Finally, yellow liquid can be prepared.

The obtained stability results are shown in FIG. 8.

The externally-applied liquid medicine containing the low-concentration atropine has a significant effect on relieving visual fatigue, but not on myopia; and the externally-applied liquid medicine containing the high-concentration atropine has a significant effect on relieving the visual fatigue and treating the myopia. After being applied with the externally-applied liquid medicine for about 4 weeks, the left eye has a myopic degree decreased from 350 degrees to 325 degrees, with a decrease of 25 degrees, and the right eye has a myopic degree decreased from 400 degrees to 375 degrees, with a decrease of 25 degrees (see FIG. 1).

Embodiment 2A: Low-concentration Homatropine (0.1%)

An eye-soothing externally-applied liquid medicine is prepared by mixing a phase A capable of regulating ocular microcirculation and intraocular pressure and relieving asthenopia, a phase B capable of replenishing nutrients to eyes, an adjuvant and purified water, where
  the phase A includes 0.1 g of homatropine by mass;
  the phase B includes the following components by mass: 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.001 g of lutein;
  the adjuvant includes the following components by mass: 0.1 g of sodium hyaluronate, 0.1 g of exopolysaccharide, 6 g of hydrogenated castor oil, 1 g of cetyl ethyl hexanoate, and 0.6 g of phenoxyethanol; and
  the mass of the purified water is 89.093 g.

The above components are divided into an oil phase, a water phase and an additive phase as follows:
  the water phase: 89.093 g of the purified water, 0.1 g of the homatropine, 0.5 g of the vitamin B1, 0.005 g of the vitamin B2, 0.001 g of the vitamin B12, 0.5 g of the adenosine triphosphate, 0.1 g of the sodium hyaluronate, and 0.1 g of the exopolysaccharide;
  the oil phase: 6 g of the hydrogenated castor oil, 1 g of the cetyl ethyl hexanoate, 1 g of the *Vaccinium myrtillus* seed oil, 1 g of the vitamin A, and 0.001 g of the lutein; and
  the additive phase: 0.6 g of the phenoxyethanol.

Preparation method: adding the components in the water phase into the purified water, and heating up to 75° C.; mixing the components in the oil phase and then stirring evenly, and heating up to 75° C.; slowly adding the oil phase into the water phase while stirring at a high speed (1450 rpm), and stirring continuously for 15 min at the high speed; after that, stirring at a reduced speed and then cooling down to 39° C.; and finally, adding the additive phase, and stirring until room temperature to obtain yellowish liquid.

The obtained stability results are shown in FIG. 9.

Embodiment 2B: High-Concentration Homatropine (2%)

The specific components and method for preparing an externally-applied liquid medicine containing homatropine (with a high concentration of 2%) are the same as those of the above-mentioned embodiment 2A, except that the concentration of the homatropine is high, that is, the dosage of the homatropine is 2% (i.e., 2 g in the water phase). Finally, yellow liquid can be prepared.

The obtained stability results are shown in FIG. 10.

Figure 2:
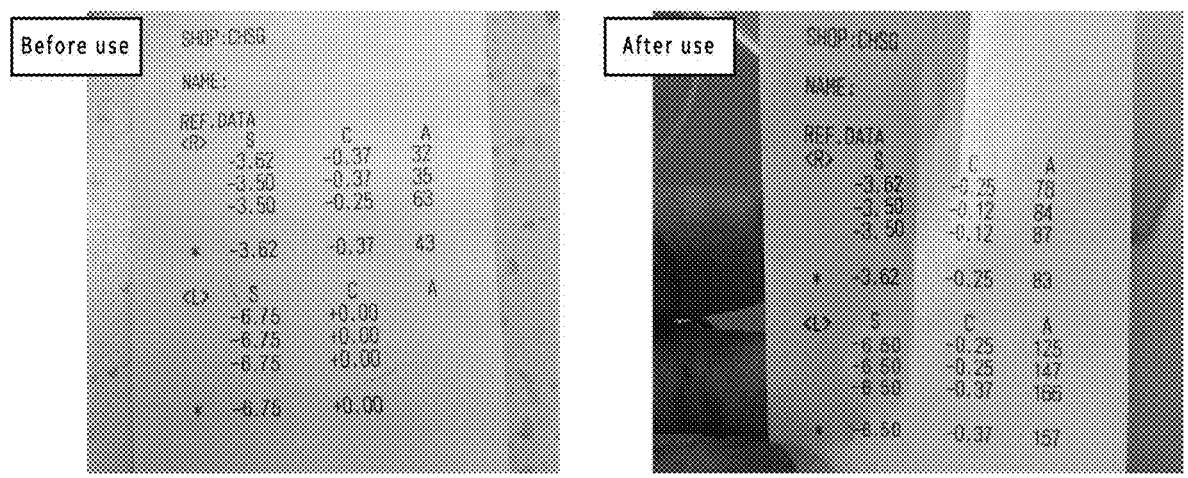
FIG. 2 shows the effect of a liquid medicine used for 4 weeks in an embodiment 2B.

The externally-applied liquid medicine containing the low-concentration homatropine has a significant effect on relieving visual fatigue, but not on myopia; and the externally-applied liquid medicine containing the high-concentration homatropine has a significant effect on relieving the visual fatigue and treating the myopia. After being applied with the externally-applied liquid medicine for about 4 weeks, the left eye has a myopic degree decreased from 675 degrees to 650 degrees, with a decrease of 25 degrees (see FIG. 2).

Embodiment 3A: Low-Concentration Tropicamide (0.1%)

An eye-soothing externally-applied liquid medicine is prepared by mixing a phase A capable of regulating ocular microcirculation and intraocular pressure and relieving asthenopia, a phase B capable of replenishing nutrients to eyes, an adjuvant and purified water, where
  the phase A includes 0.1 g of tropicamide by mass;
  the phase B includes the following components by mass: 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.0010 g of lutein;
  the adjuvant includes the following components by mass: 0.1 g of sodium hyaluronate, 0.1 g of exopolysaccharide, 6 g of hydrogenated castor oil, 1 g of cetyl ethyl hexanoate, and 0.6 g of phenoxyethanol; and
  the mass of the purified water is 89.093 g.

The above components are divided into an oil phase, a water phase and an additive phase as follows:
  the water phase: 89.093 g of the purified water, 0.1 g of the tropicamide, 0.5 g of the vitamin B1, 0.005 g of the vitamin B2, 0.001 g of the vitamin B12, 0.5 g of the adenosine triphosphate, 0.1 g of the sodium hyaluronate, and 0.1 g of the exopolysaccharide;
  the oil phase: 6 g of the hydrogenated castor oil, 1 g of the cetyl ethyl hexanoate, the *Vaccinium myrtillus* seed oil, 1 g of the vitamin A, and 0.0010 g of the lutein; and
  the additive phase: 0.6 g of the phenoxyethanol.

Preparation method: adding the components in the water phase into the purified water, and heating up to 65° C.; mixing the components in the oil phase and then stirring evenly, and heating up to 65° C.; slowly adding the oil phase into the water phase while stirring at a high speed (1600 rpm), and stirring continuously for 10 min at the high speed; after that, stirring at a reduced speed and then cooling down to 46° C.; and finally, adding the additive phase; and stirring until room temperature to obtain yellowish liquid.

The obtained stability results are shown in FIG. 11.

Embodiment 3B: High-Concentration Tropicamide (2%)

The specific components of an externally-applied liquid medicine containing tropicamide (with a high concentration of 2%) are the same as those of the above-mentioned embodiment 3A, except that the concentration of the tropicamide is high, that is, the dosage of the tropicamide is 2% (i.e., 1 g in the water phase, and 1 g in the oil phase). Finally, yellow liquid can be prepared.

The obtained stability results are shown in FIG. 12.

Figure 3:
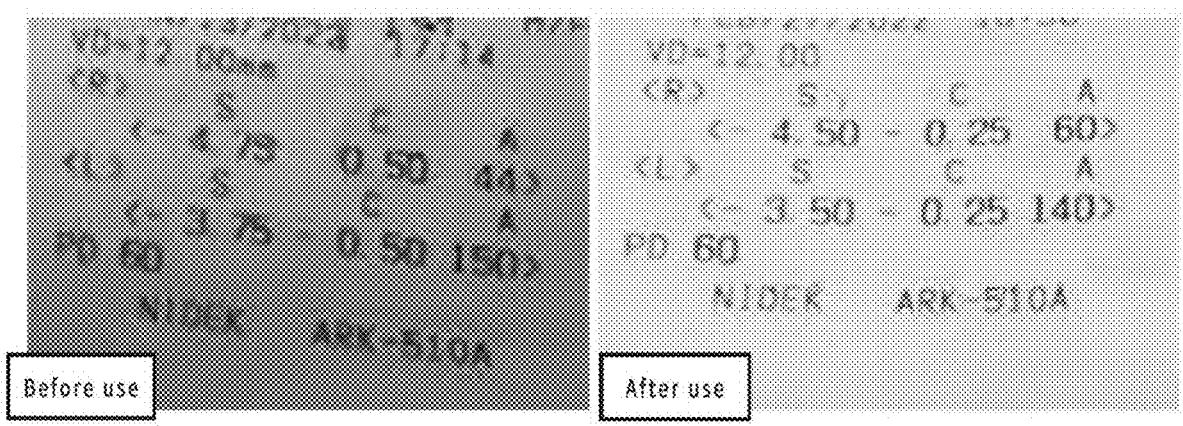
FIG. 3 shows the effect of a liquid medicine used for 4 weeks in an embodiment 3B.

The externally-applied liquid medicine containing the low-concentration tropicamide has a significant effect on relieving visual fatigue, but not on myopia; and the externally-applied liquid medicine containing the high-concentration tropicamide has a significant effect on relieving the visual fatigue and treating the myopia. After being applied with the externally-applied liquid medicine for about 4 weeks, the left eye has a myopic degree decreased from 375 degrees to 350 degrees, with a decrease of 25 degrees, and the right eye has a myopic degree decreased from 475 degrees to 450 degrees, with a decrease of 25 degrees (see FIG. 3).

Embodiment 4: Western Medicine Atropine (0.1%)+Traditional Chinese Medicine Component An eye-soothing externally-applied liquid medicine is prepared by mixing a phase A capable of regulating ocular microcirculation and intraocular pressure and relieving asthenopia, a phase B capable of replenishing nutrients to eyes, an adjuvant and purified water, where
the phase A includes the western medicine component I and the traditional Chinese medicine component II by mass, where the western medicine component I includes 0.1 g of atropine;
the traditional Chinese medicine component II includes 0.5 g of a cassia seed extract, 0.5 g of a mulberry leaf extract, 0.2 g of a marigold flower extract, 0.5 g of a fins albiziae extract, 0.5 g of an eyebright extract, 0.2 g of a common foxglove leaf extract, 0.5 g of a *Fructus lycii* extract, 0.2 g of a honeysuckle flower extract, 0.5 g of a *Flos chrysanthemi* extract, 0.5 g of a *Rhizoma gastrodiae* extract, 0.2 g of a *radix* et *Rhizoma salviae* miltiorrhizae extract, and 0.2 g of a *Radix codonopsis* extract;
the phase B includes the following components by mass: 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.001 g of lutein;
the adjuvant includes the following components by mass: 0.1 g of sodium hyaluronate, 0.1 g of exopolysaccharide, 6 g of hydrogenated castor oil, 1 g of cetyl ethyl hexanoate, and 0.6 g of phenoxyethanol; and
the mass of the purified water is 84.593 g.

The above components are divided into an oil phase, a water phase and an additive phase as follows:
the water phase: 84.593 g of the purified water, 0.1 g of the atropine, 0.5 g of the cassia seed extract, 0.5 g of the mulberry leaf extract, 0.2 g of the marigold flower extract, 0.5 g of the fibs albiziae extract, 0.5 g of the eyebright extract, 0.2 g of the common foxglove leaf extract, 0.5 g of the *Fructus lycii* extract, 0.2 g of the honeysuckle flower extract, 0.5 g of the *Flos chrysanthemi* extract, 0.5 g of the *Rhizoma gastrodiae* extract, 0.2 g of the *radix* et *Rhizoma salviae* miltiorrhizae extract, 0.2 g of the *Radix codonopsis* extract, 0.5 g of the vitamin B1, 0.005 g of the vitamin B2, 0.001 g of the vitamin B12, 0.5 g of the adenosine triphosphate, 0.1 g of the sodium hyaluronate, and 0.1 g of the exopolysaccharide;
the oil phase: 6 g of the hydrogenated castor oil, 1 g of the cetyl ethyl hexanoate, 1 g of the *Vaccinium myrtillus* seed oil, 1 g of the vitamin A, and 0.001 g of the lutein; and
the additive phase: 0.6 g of the phenoxyethanol.

Preparation method: adding the components in the water phase into the purified water, and heating up to 85° C.; mixing the components in the oil phase and then stirring evenly, and heating up to 85° C.; slowly adding the oil phase into the water phase while stirring at a high speed (1400 rpm), and stirring continuously for 10 min at the high speed; after that, stirring at a reduced speed and then cooling down to 45° C.; and finally, adding the additive phase, and stirring until room temperature to obtain brown liquid.

The obtained stability results are shown in FIG. 13.

Figure 4:
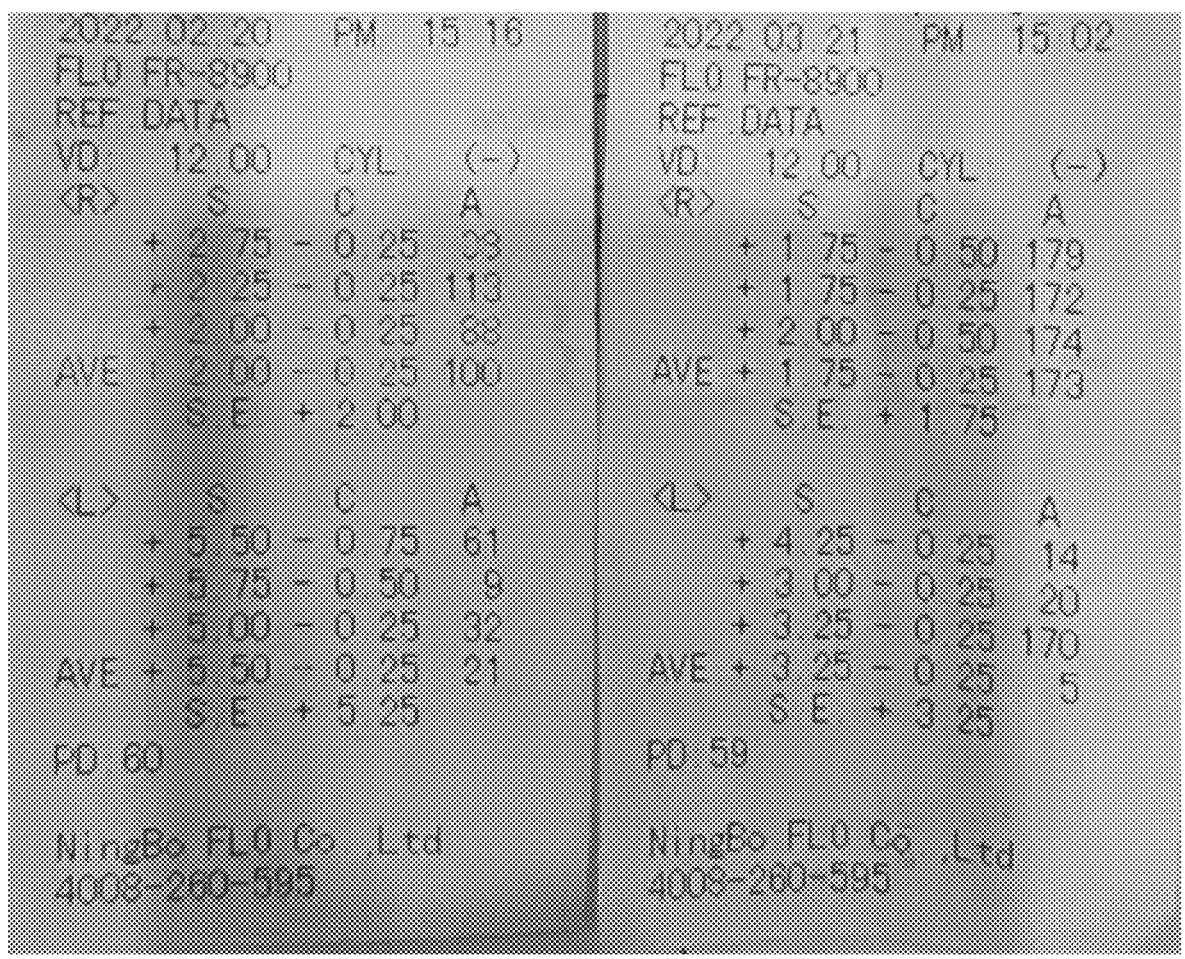
FIG. 4 shows the effect of a liquid medicine used for 4 weeks in an embodiment 4.

The traditional Chinese medicine composition has a significant effect on relieving visual fatigue and treating myopia. After being applied with the externally-applied liquid medicine for about 4 weeks, the left eye has a myopic degree decreased from 525 degrees to 325 degrees, with a decrease of 200 degrees, and the right eye has a myopic degree decreased from 200 degrees to 175 degrees, with a decrease of 25 degrees (see FIG. 4).

Embodiment 5: Western Medicine Atropine (0.1%)+Traditional Chinese Medicine Component An eye-soothing externally-applied liquid medicine is prepared by mixing a phase A capable of regulating ocular microcirculation and intraocular pressure and relieving asthenopia, a phase B capable of replenishing nutrients to eyes, an adjuvant and purified water, where
the phase A includes a western medicine component I and a traditional Chinese medicine component II by mass, where the western medicine component I includes 0.1 g of atropine;
the traditional Chinese medicine component II includes 0.5 g of a cassia seed extract, 0.5 g of a mulberry leaf extract, 0.2 g of a marigold flower extract, 0.5 g of a flus albiziae extract, 0.5 g of an eyebright extract, 0.2 g of a common foxglove leaf extract, 0.5 g of a *Flos buddlejae* extract, 0.5 g of a *Flos eriocauli* extract, 0.5 g of a *Celosiae semen* extract, 0.1 g of a *radix* et *Rhizoma ginseng* extract and 0.5 g of a *Caulis dendrobii* extract;
the phase B includes the following components by mass: 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.001 g of lutein;
the adjuvant includes the following components by mass: 0.1 g of sodium hyaluronate, 0.1 g of exopolysaccharide, 6 g of hydrogenated castor oil, 1 g of cetyl ethyl hexanoate, and 0.6 g of phenoxyethanol; and
the mass of the purified water is 84.593 g.

The above components are divided into an oil phase; a water phase and an additive phase as follows:

the water phase: 84.593 g of the purified water, 0.1 g of the atropine, 0.5 g of the cassia seed extract, 0.5 g of the mulberry leaf extract, 0.2 g of the marigold flower extract, 0.5 g of the fibs albiziae extract, 0.5 g of the eyebright extract, 0.2 g of the common foxglove leaf extract, 0.5 g of the *Flos buddlejae* extract, 0.5 g of the *Flos eriocauli* extract, 0.5 g of the *Celosiae semen* extract, 0.1 g of the *radix* et *Rhizoma ginseng* extract, 0.5 g of the *Caulis dendrobii* extract, 0.5 g of the vitamin B1, 0.005 g of the vitamin B2, 0.001 g of the vitamin B12, 0.5 g of the adenosine triphosphate, 0.1 of the sodium hyaluronate, and 0.1 g of the exopolysaccharide;

the oil phase: 6 g of the hydrogenated castor oil, 1 g of the cetyl ethyl hexanoate, 1 g of the *Vaccinium myrtillus* seed oil, 1 g of the vitamin A, and 0.001 g of the lutein; and the additive phase: 0.6 g of the phenoxyethanol.

Preparation method: adding the components in the water phase into the purified water, and heating up to 80° C.; mixing the components in the oil phase and then stirring evenly, and heating up to 80° C.; slowly adding the oil phase into the water phase while stirring at a high speed (2000 rpm), and stirring continuously for 10 min at the high speed; after that, stirring at a reduced speed and then cooling down to 40° C.; and finally, adding the additive phase, and stirring until room temperature to obtain brown liquid.

The obtained stability results are shown in FIG. 14.

Figures 5, 6:
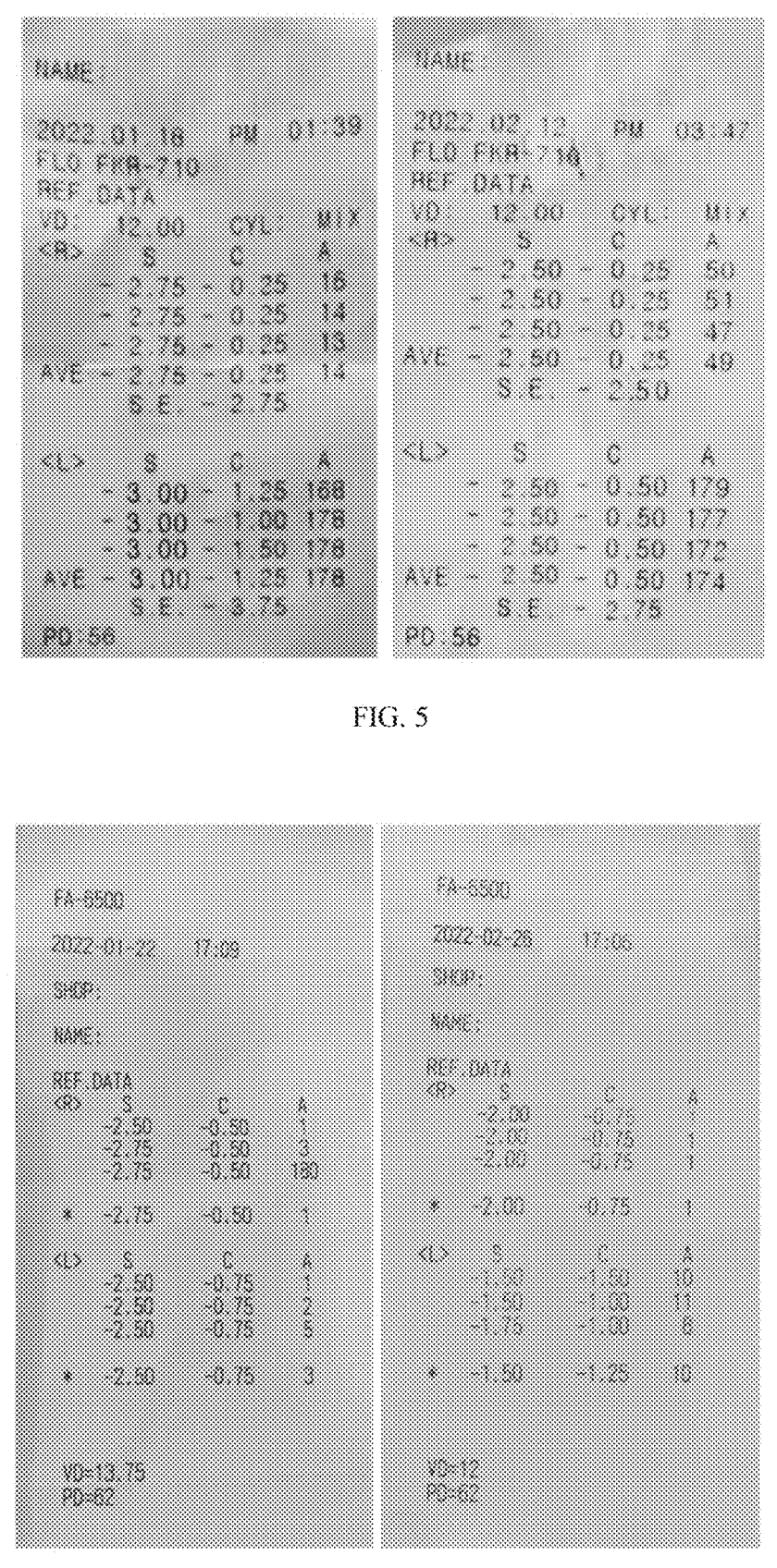

The traditional Chinese medicine composition has a significant effect on relieving visual fatigue and treating myopia. After being applied with the externally-applied liquid medicine for about 3 weeks, the left eye has a myopic degree decreased from 375 degrees to 275 degrees, with a decrease of 100 degrees, and the right eye has a myopic degree decreased from 275 degrees to 250 degrees, with a decrease of 25 degrees (see FIG. 5).

Embodiment 6: Traditional Chinese Medicine Component

An eye-soothing externally-applied liquid medicine is prepared by mixing a phase A capable of regulating ocular microcirculation and intraocular pressure and relieving asthenopia, a phase B capable of replenishing nutrients to eyes, an adjuvant and purified water, where the phase A includes a traditional Chinese medicine component II by mass, which includes the following components: 0.5 g of a cassia seed extract, 0.5 g of a mulberry leaf extract, 0.2 g of a marigold flower extract, 0.5 g of a flus albiziae extract, 0.5 g of an eyebright extract, 0.2 g of a common foxglove leaf extract, 0.5 g of a *Semen cuscutae* extract, 0.5 g of a glossy privet fruit extract, 0.2 g of a *Radix angelicae* sinensis extract, 0.5 g of a prunella vulgaris extract, and 0.5 g of a swordlike *Atractylodes rhizome* extract;

the phase B includes the following components by mass: 1 g of vitamin A, 0.5 g of vitamin B1, 0.005 g of vitamin B2, 0.001 g of vitamin B12, 0.5 g of adenosine triphosphate, 1 g of *Vaccinium myrtillus* seed oil, and 0.001 g of lutein;

the adjuvant includes the following components by mass: 0.1 g of sodium hyaluronate, 0.1 g of exopolysaccharide, 6 g of hydrogenated castor oil, 1 g of cetyl ethyl hexanoate, and 0.6 g of phenoxyethanol; and the mass of the purified water is 84.593 g.

The above components are divided into an oil phase, a water phase and an additive phase as follows:

the water phase: 84.593 g of the purified water, 0.5 g of the cassia seed extract, 0.5 g of the mulberry leaf extract, 0.2 g of the marigold flower extract, 0.5 g of the fibs albiziae extract, 0.5 g of the eyebright extract, 0.2 g of the common foxglove leaf extract, 0.5 g of the *Semen cuscutae* extract, 0.5 g of the glossy privet fruit extract, 0.2 g of the *Radix angelicae* sinensis extract, 0.5 g of the prunella vulgaris extract, 0.5 g of the swordlike *Atractylodes rhizome* extract, 0.5 g of the vitamin B1, 0.005 g of the vitamin B2, 0.001 g of the vitamin B12, 0.5 g of the adenosine triphosphate, 0.1 g of the sodium hyaluronate, and 0.1 g of the exopolysaccharide;

the oil phase: 6 g of the hydrogenated castor oil, 1 g of the cetyl ethyl hexanoate, 1 g of the *Vaccinium myrtillus* seed oil, 1 g of the vitamin A, and 0.001 g of the lutein; and the additive phase: 0.6 g of the phenoxyethanol.

Preparation method: adding the components in the water phase into the purified water, and heating up to 78° C.; mixing the components in the oil phase and then stirring evenly, and heating up to 78° C.; slowly adding the oil phase into the water phase while stirring at a high speed (1500 rpm), and stirring continuously for 15 min at the high speed; after that, stirring at a reduced speed and then cooling down to 40° C.; and finally, adding the additive phase, and stirring until room temperature to obtain brown liquid.

The obtained stability results are shown in FIG. 15. The traditional Chinese medicine composition has a significant effect on relieving visual fatigue and treating myopia. After being applied with the externally-applied liquid medicine for about 4 weeks, the left eye has a myopic degree decreased from 300 degrees to 225 degrees, with a decrease of 75 degrees, and the right eye has a myopic degree decreased from 300 degrees to 225 degrees, with a decrease of 75 degrees (see FIG. 6).

What is claimed is:

1. An eye-soothing externally-applied liquid medicine for exclusive application to eyelid skin, comprising:
   0.01-10 wt % of one or more compounds selected from the group consisting of atropine, homatropine, or tropicamide;
   0.1-6 wt % of one or more plant extracts selected from the group consisting of a *Cassia* seed extract, a mulberry leaf extract, a marigold flower extract, a *Flos albiziae* extract, an eyebright extract, or a common foxglove leaf extract;
   0.001-6 wt % of Vitamin A, Vitamin B1, Vitamin B2, Vitamin B12, lutein, adenosine triphosphate, and *Vaccinium myrtillus* seed oil;
   0.1-10 wt % of hydrogenated castor oil;
   1-10 wt % of cetyl ethyl hexanoate;
   0.1-2 wt % of phenoxyethanol; and
   water.

2. The eye-soothing externally-applied liquid medicine according to claim 1, wherein the eye-soothing externally-applied liquid medicine is prepared into preparation forms comprising sprays, essences, creams, patches, gels, emulsions, and aqua-gels.

3. The eye-soothing externally-applied liquid medicine according to claim 1, further comprising one or more of sodium hyaluronate, exopolysaccharide, or *sclerotium* gum.

4. The eye-soothing externally-applied liquid medicine according to claim 3, wherein the eye-soothing externally-applied liquid medicine is prepared into preparation forms comprising sprays, essences, creams, patches, gels, emulsions, and aqua-gels.

5. The eye-soothing externally-applied liquid medicine according to claim 3, further comprising one or more of a *Fructus lycii* extract, a honeysuckle flower extract, a *Flos chrysanthemi* extract, a *Rhizoma gastrodiae* extract, a *Radix et Rhizoma Salviae miltiorrhizae* extract, a *Radix scutellariae* extract, or a *Radix codonopsis* extract.

6. The eye-soothing externally-applied liquid medicine according to claim 5, wherein the eye-soothing externally-applied liquid medicine is prepared into preparation forms comprising sprays, essences, creams, patches, gels, emulsions, and aqua-gels.

7. The eye-soothing externally-applied liquid medicine according to claim 5, further comprising one or more of a *Semen cuscutae* extract, a glossy privet fruit extract, a *Radix Angelicae sinensis* extract, a Prunella vulgaris extract, or a swordlike *Atractylodes* rhizome extract.

8. The eye-soothing externally-applied liquid medicine according to claim 7, wherein the eye-soothing externally-applied liquid medicine is prepared into preparation forms comprising sprays, essences, creams, patches, gels, emulsions, and aqua-gels.

9. The eye-soothing externally-applied liquid medicine according to claim 7, further comprising one or more of a *Flos buddlejae* extract, a *Flos eriocauli* extract, a *Celosiae semen* extract, a *Radix et Rhizoma ginseng* extract, or a *Caulk dendrobii* extract.

10. The eye-soothing externally-applied liquid medicine according to claim 9, wherein the eye-soothing externally-applied liquid medicine is prepared into preparation forms comprising sprays, essences, creams, patches, gels, emulsions, and aqua-gels.

11. The eye-soothing externally-applied liquid medicine according to claim 9, comprising:

0.1 wt % of the atropine;
0.5 wt % of the *Cassia* seed extract;
0.5 wt % of the mulberry leaf extract;
0.2 wt % of the marigold flower extract;
0.5 wt % of the *Flos albiziae* extract;
0.5 wt % of the eyebright extract;
0.2 wt % of the common foxglove leaf extract;
0.2 wt % of the *Radix codonopsis* extract;
0.5 wt % of the *Semen cuscutae* extract;
0.5 wt % of the *Celosiae semen* extract;
0.5 wt % of the *Flos buddlejae* extract;
1.0 wt % of the Vitamin A;
0.5 wt % of the Vitamin B1;
0.005 wt % of the Vitamin B2;
0.001 wt % of the Vitamin B12;
0.5 wt % of the adenosine triphosphate;
1.0 wt % of the *Vaccinium myrtillus* seed oil;
0.001 wt % of the lutein;
0.1 wt % of the sodium hyaluronate;
0.1 wt % of the exopolysaccharide;
6.0 wt % of the hydrogenated castor oil;
1.0 wt % of the cetyl ethyl hexanoate;
0.6 wt % of the phenoxyethanol; and
water.

12. The eye-soothing externally-applied liquid medicine according to claim 11, wherein the eye-soothing externally-applied liquid medicine is prepared into preparation forms comprising sprays, essences, creams, patches, gels, emulsions, and aqua-gels.

\* \* \* \* \*